No. 851,830. PATENTED APR. 30, 1907.
W. R. PARK.
VALVE.
APPLICATION FILED DEC. 14, 1906.

WITNESSES.
INVENTOR
William R. Park
by Roberts & Mitchell
Attorneys

UNITED STATES PATENT OFFICE.

WILLIAM R. PARK, OF TAUNTON, MASSACHUSETTS, ASSIGNOR TO UNITED INJECTOR COMPANY, OF NEW YORK, N. Y., A CORPORATION OF NEW YORK.

VALVE.

No. 851,830.     Specification of Letters Patent.     Patented April 30, 1907.

Application filed December 14, 1906. Serial No. 347,768.

*To all whom it may concern:*

Be it known that I, WILLIAM R. PARK, a citizen of the United States, and a resident of Taunton, in the county of Bristol and State of Massachusetts, have invented new and useful Improvements in Valves, of which the following is a specification.

My invention relates to check valves and consists in certain improvements which are especially adapted to emergency check valves which normally operate in one direction, but which may be called upon to give relief in the reverse direction.

My invention is peculiarly applicable to carbureters for internal combustion engines and my improvements constitute in that connection a valve to automatically regulate the supply of air to a carbureter and to relieve the sudden pressure in the carbureter which sometimes is developed through accidental back firing of the engine.

Figure 1:
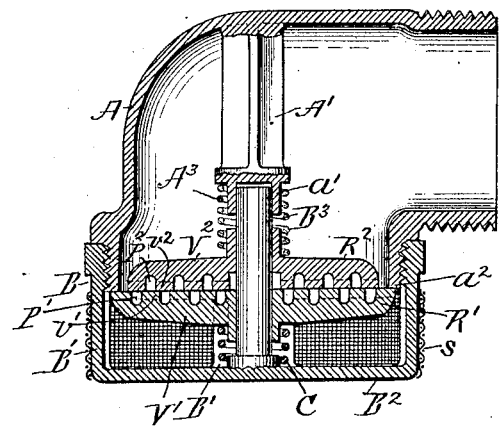
Figure 2:
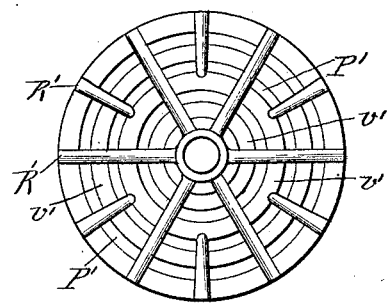

In the drawings hereto annexed which illustrate an embodiment of my invention, Figure 1 is a vertical cross section of a valve and its housing and Fig. 2 is a plan view from below of one of the valve members shown in Fig. 1.

A represents the housing of my improved valve, this housing consisting in effect of a framework or support for the valve itself, and also a portion of the air conduit leading to the mixing chamber of the carbureter. Although such a valve as embodies my improvements may be employed in other situations where the conditions are analogous to those which are characteristic of the gas engine carbureter, namely where a check valve is employed to permit the passage of fluid only in one direction under normal conditions, but which may, upon emergency act as a check valve in the opposite direction to permit a reverse flow of fluid. A cage B provided with bars B' and a base B² is secured to the housing A preferably by being screw threaded thereto. Upon the base B² there is formed the guiding stem B³ which, when the cage is screwed to place, enters the socket $a'$ formed in the end of the stud A' which is preferably an integral portion of the housing A. The valve consists of two members which, for convenience of distinction I will term the primary and secondary members, although by employing these terms I do not wish to be understood as suggesting that either member is inherently subordinate to the other as their relations and functions are mutual. The member V' which I call the primary member, is sleeved to slide upon the guiding stem B³ and is seated upward against the valve seat $a^2$ which is formed upon the housing A. The primary member V' is held up to this seat by means of the spring C which is sufficient to hold the member V' against the seat and to sustain it in that position against the normal effects of the secondary member V². The secondary member V² is likewise sleeved to slide upon the guide stem B³, and the annular lip of the socket $a'$ serves as a stop to limit the upward movement of the secondary member V². Each of the valve members is provided with openings which serve as ports for the admission of air into the housing A. In the form shown in the drawings which is the form I prefer, each of the valve members is composed of radial ribs R' R² and annular bars $v'$, $v^2$, the spaces between these bars constituting the ports P' P². In their relation to each other the ports P' P² of the valve members V', V² respectively are staggered so that when the annular bars $v^2$ of the member V² are seated upon the valve member V', they bridge between the annular bars $v'$ and close the ports P', the bars V' likewise closing ports P². Under normal conditions of operation the member V' being held firmly against the seat $a^2$ by the spring C serves solely as the seat for the valve member V² which alone has movement imparted to it. When, by the operation of the apparatus associated with this device air is required in the housing A, the valve member V² being very light, and restrained only by the spring A³, rises and air is admitted through the ports P' and P² and around the outer periphery of the valve member V². The valve ports P' P² and the valve members V' V² are preferably so proportioned that the full opening provided by the extreme movement of the valve member V² will exceed in area the most constricted portion of the cross section of the tubes or passages which are supplied from the housing A. If, as is usually the case in carbureters for gas engines, there is an air throttling device provided, when this throttling device is partially closed, the requirements of the valve opening are diminished and the valve member V² will rise proportionately less and will thus automatically regulate the quantity of air admitted and maintain a substantially constant pressure in the passages supplied thereby.

When occasion demands, the two valve members V', V² may operate in unison to relieve an excess pressure in the housing A. For instance, if my improved valve be applied to a carbureter of a gas engine and back firing takes place, the pressure generated in the carbureter and the conduits associated therewith seats the valve member V² on the member V' with such force as to compress the spring C and cause the member V' to leave its seat $a^2$, thus relieving the pressure in the housing A and other passages. If desired, a strainer S of wire gauze may be wrapped around the cage B and secured thereto.

The above described valve, in its normal operation as an automatic regulator for air supply, is extremely sensitive and accurate. By reason of the grid construction of the valve members a very slight movement is all that is required to afford an ample valve opening, and a minimum of resistance opposed to the passage of air through the valve ports.

What I claim and desire to secure by Letters Patent is:

The combination of a housing, a stud therein, a cage removably secured to the housing, a guiding stem on the cage joined to the housing stud when the cage is in position on the housing, a valve seat on the housing, a pair of valve members slidingly mounted on the stem and provided with mutually co-operating faces and ports, the primary valve member seating on the housing valve seat, the secondary valve member seating on the primary member, and valve springs controlling the valve members respectively, the spring for the primary member being stronger than that for the secondary member.

Signed by me at Boston, Suffolk county, Massachusetts this eleventh day of December 1906.

WILLIAM R. PARK.

Witnesses:
ODIN ROBERTS,
BELVIN T. WILLISTON.